June 12, 1956  A. B. McBRIDE  2,750,054
ARTICLE UNLOADING APPARATUS
Filed June 10, 1953  6 Sheets-Sheet 1

INVENTOR.
ARTHUR B. McBRIDE
BY Walter J. Monacelli
his ATTORNEY.

June 12, 1956　　　A. B. McBRIDE　　　2,750,054
ARTICLE UNLOADING APPARATUS
Filed June 10, 1953　　　6 Sheets-Sheet 3

INVENTOR.
ARTHUR B. McBRIDE
BY Walter J. Monacelli
his ATTORNEY

June 12, 1956  A. B. McBRIDE  2,750,054
ARTICLE UNLOADING APPARATUS
Filed June 10, 1953  6 Sheets-Sheet 4

INVENTOR.
ARTHUR B. McBRIDE
BY
Walter J. Monacelli
his ATTORNEY

June 12, 1956  A. B. McBRIDE  2,750,054
ARTICLE UNLOADING APPARATUS
Filed June 10, 1953  6 Sheets-Sheet 6

INVENTOR.
ARTHUR B. McBRIDE
BY Walter J. Monacelli
his ATTORNEY

United States Patent Office 2,750,054
Patented June 12, 1956

2,750,054

ARTICLE UNLOADING APPARATUS

Arthur B. McBride, Cheswick, Pa., assignor to Koppers Company, Inc., a corporation of Delaware Application June 10, 1953, Serial No. 360,800

10 Claims. (Cl. 214—89)

The present invention relates to an article handling apparatus. More particularly, the invention relates to an apparatus for unloading material and especially to an apparatus for unloading ties from a railroad car.

In the prior art, various devices are used for unloading ties from a railroad car. One of the more well known devices used is an arrangement whereby a cable is strung thru the opened doors of either side of a railroad car and both ends of the cable supported on opposed upright standards, the cable being so positioned that it is above the tie load in the car. Mounted on the cable is a moveable trolley having an article handling hook suspended therefrom. When the article handling hook is engaged to a tie load, the trolley is run along the cable to a point outside the railroad car where the load is then disengaged from the hook and placed upon a conveyor for conveyance to a selected point. The device, although simple in its general arrangement, presents many difficulties in unloading the ties. For example, every time it is desired to unload a box car it is necessary to release the cable from at least one of the opposed standards in order that it may be threaded thru the opened doors of the car. Furthermore, the heavy load of the ties on the cable causes the cable to sag, making operations even more difficult. And, finally, this cable arrangement permits only limited maneuverability during the loading operations.

One of the features of the present invention is to provide an article handling apparatus designed for a short conveying system to permit rapid unloading operations.

Another feature of the present invention is to provide an article handling apparatus that has an adjustable conveying unit whereby the articles can be loaded directly onto the conveyor in minimum time.

Still another feature of the invention is to provide an apparatus which can be quickly and easily placed into effective operation.

The present invention provides as still another feature an article handling apparatus that is readily adaptable to all types of railroad cars.

Still another feature of the present invention is to provide an article handling apparatus that is operable by minimum personnel but yet provides maximum maneuverability.

More particularly, the present invention provides an article handling apparatus comprising a plurality of sets of spaced uprights; a conveyor mounted between said sets of spaced uprights and adapted to be adjusted at an incline thereto; a track means mounted between said sets of spaced uprights above said conveyor, said track means being adjustable between said uprights in a direction substantially normal thereto and being of greater length than the distance between adjacent sets of spaced uprights so as to have one end project in cantilever fashion from said spaced sets of uprights; a trolley means slideably positioned on said track means; said trolley means having an article handling hook suspended therefrom in moveable position above said conveyor; and power means connected to said trolley means, said power means being adapted to move said trolley means to the extended cantilever portion of said track means where the article handling hook may be loaded, then to move said trolley means above the conveyor where the hook may be automatically unloaded and returned to the loading position.

It is obvious that various changes can be made by one skilled in the art in the arrangement, form construction, and type of the various elements disclosed without departing from the scope or spirit of this invention.

Reference will now be made to the accompanying drawings which illustrate and exemplify a preferred embodiment of the invention adapted for the practice thereof.

Fig. 7 is an end view of the hook spreader disclosed in Fig. 1.

Figure 1:
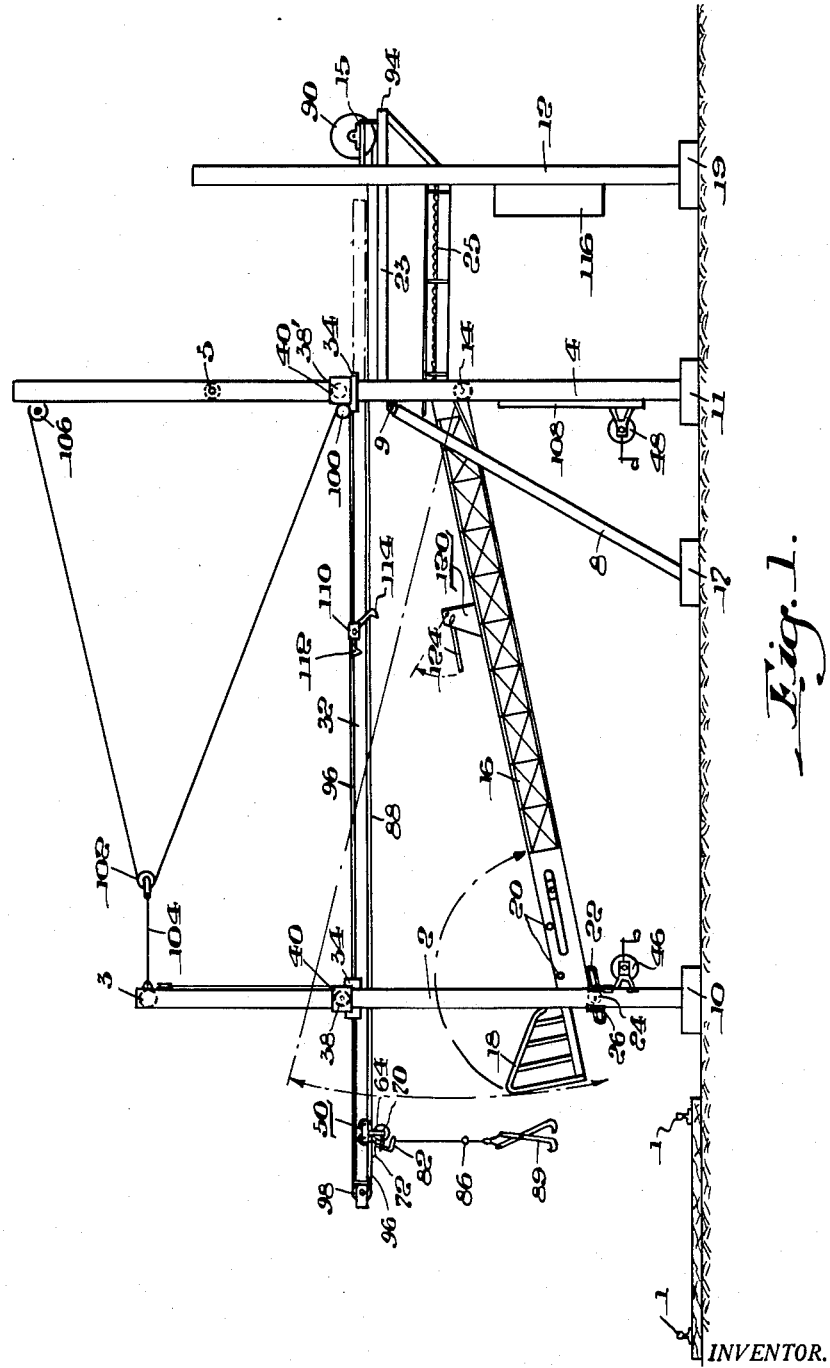
Fig. 1 is an elevational side view of the article handling apparatus.
Figure 2:
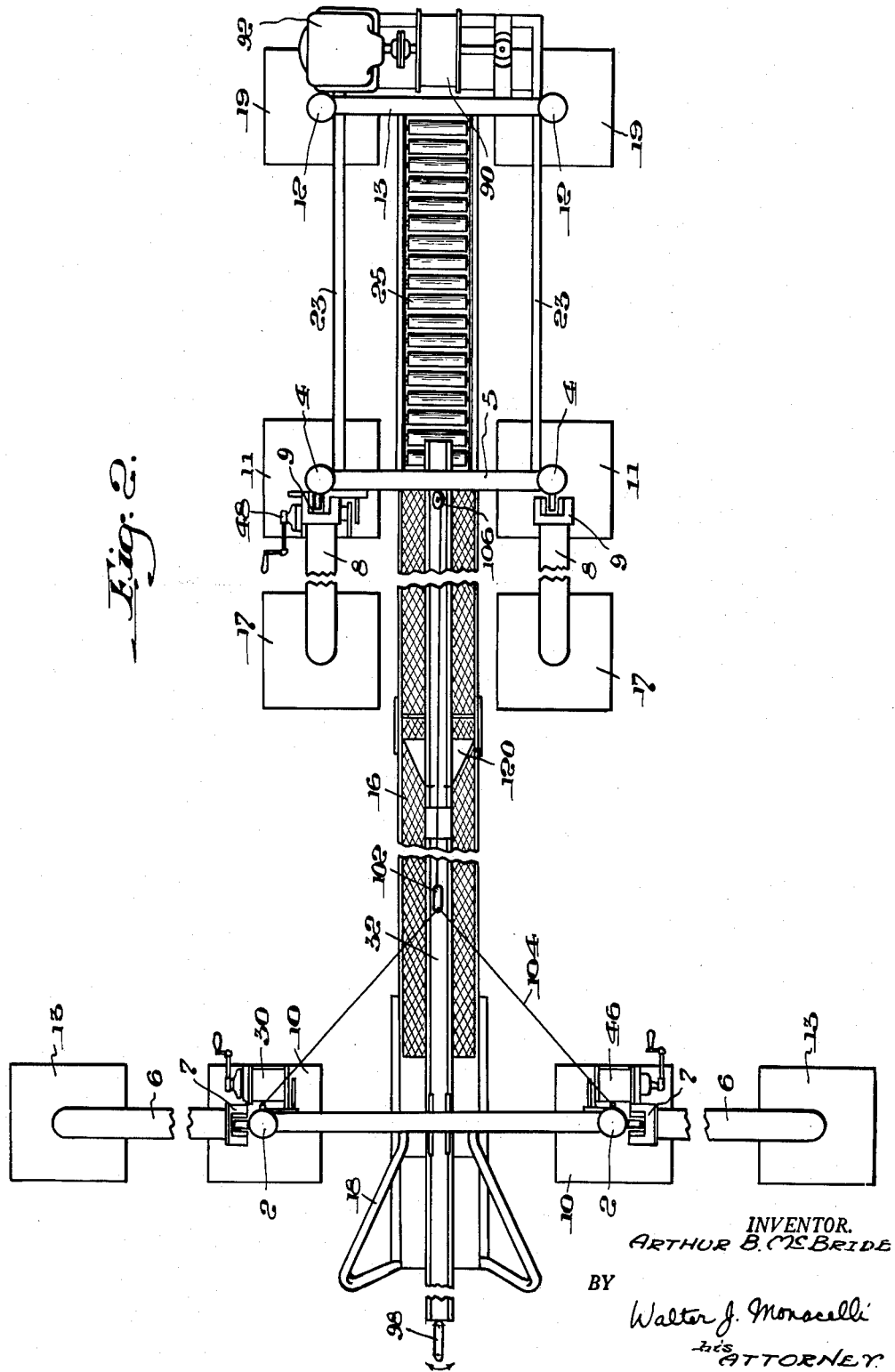
Fig. 2 is an enlarged top plan view of the apparatus disclosed in Fig. 1.
Figure 3:
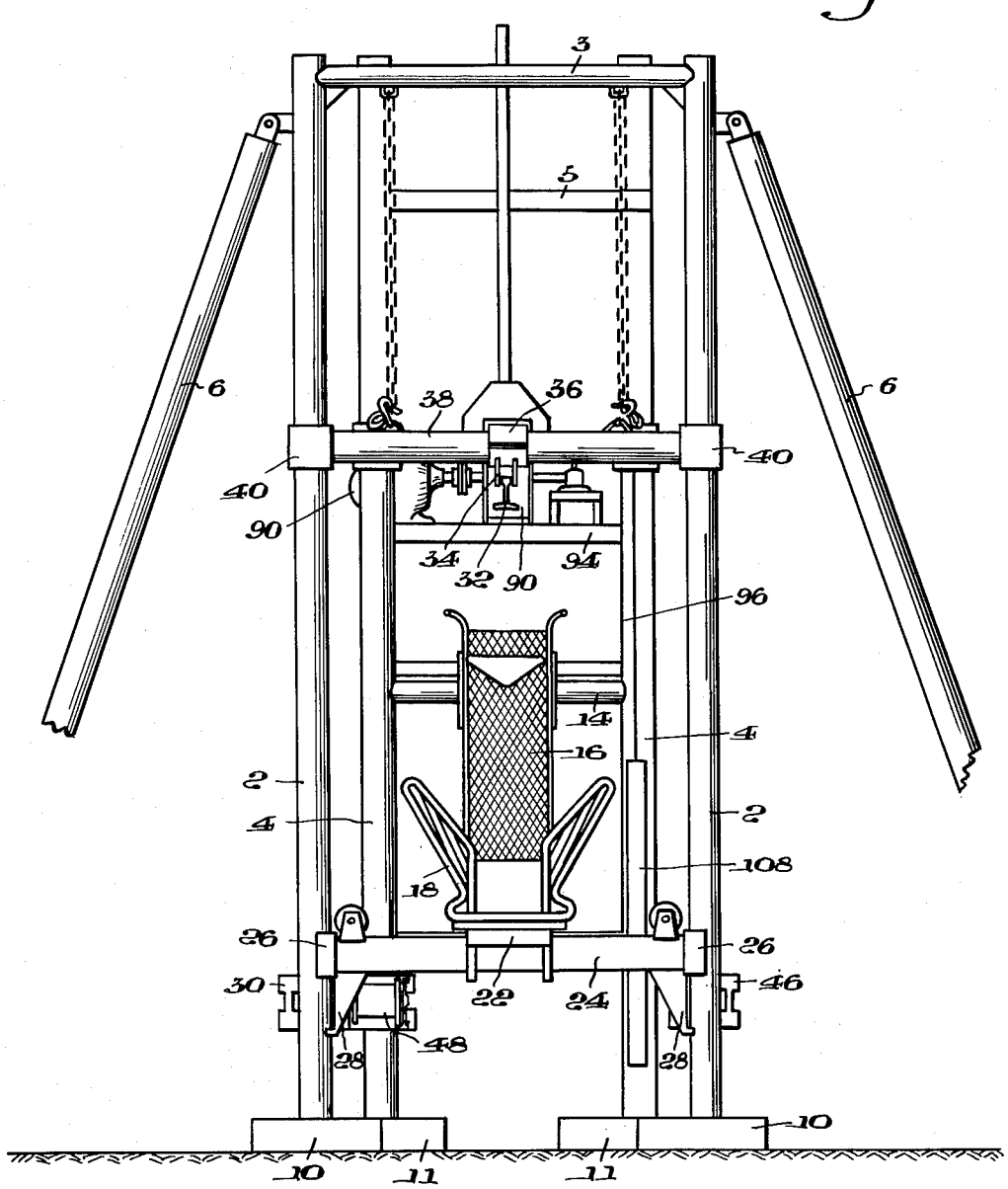
Fig. 3 is an enlarged elevational end view of the apparatus of Fig. 1.

Referring to Figs. 1–3 of the drawings, a set of upright bars 2, 2 are vertically positioned in the foundation members 10, 10 alongside railroad tracks 1. A second set of upright bars 4, 4 are vertically positioned in spaced relationship to the first set of uprights 2, 2 in foundation members 11, 11. An upper cross-bar member 3 is positioned between the first set of uprights 2, 2 and an upper cross-bar member 5 is positioned between the second set of upright bars 4, 4. Brace members 6, 6 mounted in foundations 13, 14 are used to support the uprights 2, 2 in a vertical position, being connected to the uprights thru semi-universal joints 7, 7. Braces 8, 8 mounted in foundation members 17, 17 are used to support the uprights 4, 4 thru semi-universal joints 9, 9. A third set of uprighst 12, 12 are vertically positioned in foundation members 19, 19 in spaced relationship from the second set of uprights 4, 4 and are connected together by a cross-bar member 13 (Fig. 2.). Truss members 23 connect uprights 12, 12 to uprights 4, 4 and an idle roll conveyor 25 is mounted between these sets of uprights. It is to be understood that the idle roll conveyor 25 may be eliminated entirely and a driven conveyor system used throughout.

Mounted between the lower portion of the uprights 4, 4 is the slide-bar member 14. Pivotably and slideably mounted on this slide-bar member 14 is one end of the conveyor 16. The conveyor can be of the endless type or any other selected type and in the preferred embodiment of the invention, is shown to have a folding chute 18 pivotable about the pin 20 positioned near the loading end of the conveyor (Fig. 1). This folding chute permits the unloading apparatus to be positioned in close proximity to the railroad car, the chute being folded back away from the sides of the railroad car. When the railroad car has been properly positioned before the unloading apparatus, the chute is lowered to rest on the railroad car gunnels. As may be seen in Fig. 3, the end of the conveyor having the folding chute 18 is attached to a slide-bar member 24, guidable between the uprights 2, 2, by the guide brackets 26 and 28 fixed to the respective ends of the member 24. A winch 30 (as shown in Fig. 2) is used with a cable (not shown) to raise and lower the adjustable slide-bar member 24 thus permitting the loading end of the conveyor 16 to pivot about the slide-bar 14, the conveyor being adjustable at an incline in accordance with the height of the tie load.

Mounted between the sets of spaced upright bars 2, 2 and 4, 4 above the conveyor 16 is the track member or rail 32. This track member is suspended at its ends from saddle members 34 integral with horizontally adjustable brackets 36. One such bracket 36 is mounted on each of the vertically adjustable slide-bars 38 and 38'. The slide-bars 38 and 38' are in turn adjustably supported between the uprights 2, 2 and 4, 4 respectively by means of bar-guide brackets 40. A winch 46 is used to raise or lower the slide-bar member 38 and a winch 48 is used to raise or lower the slide-bar member 38'. This adjustable feature permits the adjustment of the rail in accordance with the height of the load in the railroad car.

Figure 4:
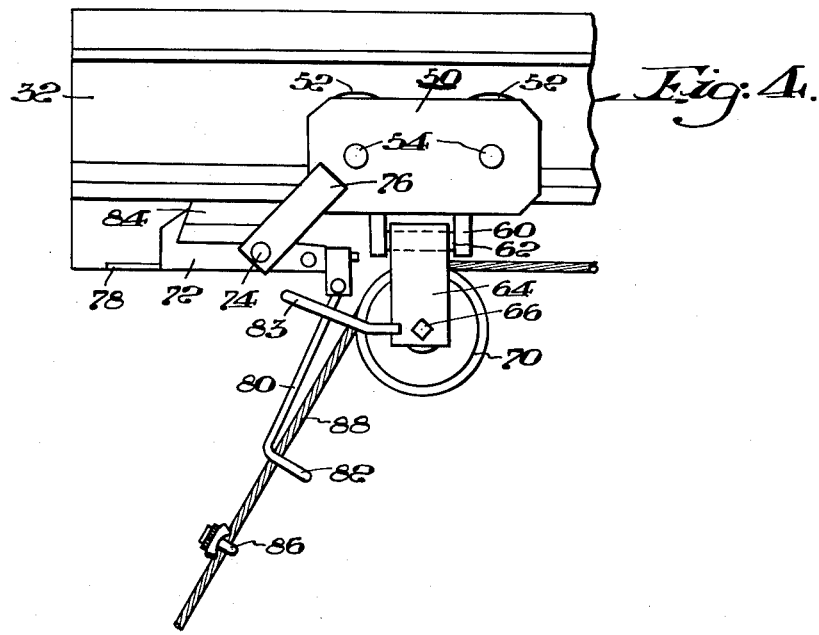
Fig. 4 is an enlarged side view of the trolley means and track disclosed in Fig. 1.
Figure 5:
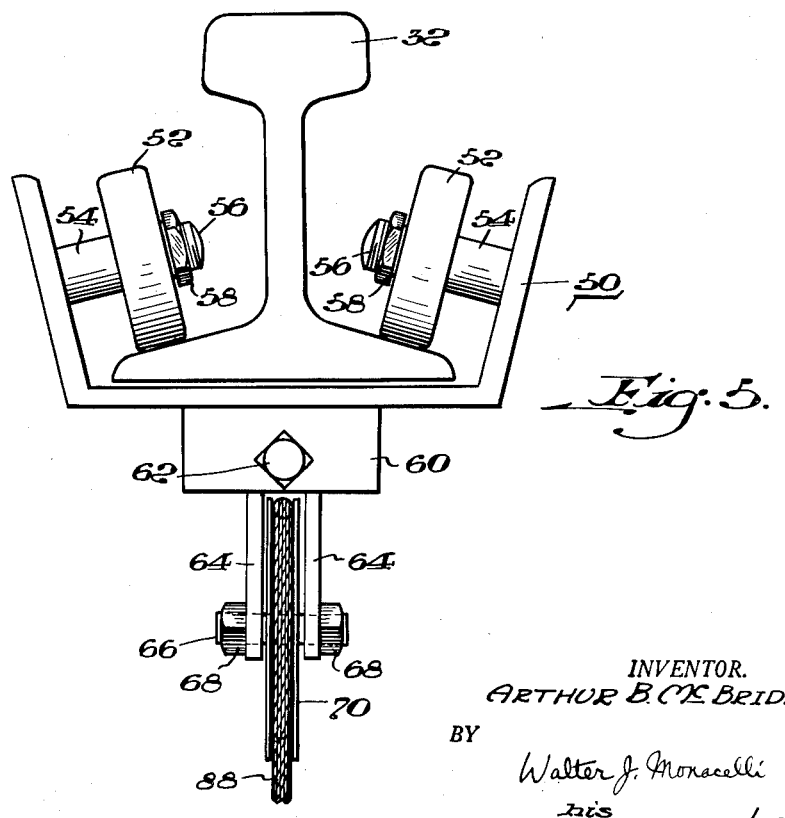
Fig. 5 is an end view of the apparatus disclosed in Fig. 4.

Mounted on the adjustable rail 32 is a trolley carriage 50. As may be seen in Figs. 4 and 5 of the drawings, the trolley carriage 50 has wheels 52 rotatably mounted on axles 54 attached to the carriage sides. The axles 54 terminate in threaded portions 56, and nuts 58 are threaded thereon to retain the wheels 52 in place. A saddle member 60 is suspended from the lower portion of the carriage 50. This saddle member 60 carries a rotatable pin 62 from which are suspended the spaced strap members 64. An axle 66 having threaded end portions connects the lower portion of the spaced strap member 64, and nuts 68 are attached to the threaded ends to hold said axle in place. Rotatably mounted on the axle-between the spaced straps 64 is a sheave wheel 70. As is obvious from Fig. 5, the sheave wheel 70 may thus be pivoted about the pin 62 permitting maneuverability during loading operations.

Affixed to carriage 50 is an extension member 76. The free end of this extension member carries a pin 74 and pivotally mounted about this pin is a latch bar 72. Integral with one end of this latch bar 72 is an eye ring 78, and integral with the other end of the latch bar is release lever 80, having an eye ring 82 extending therefrom. A latch block 84 is attached to the rail 32 and is adapted to be engaged by the latch bar 72 during loading operations. Running over the sheave wheel 70 is the free end of a cable 88. The cable then passes thru eye ring 82 of the release lever 80, the cable being guided by cable guide 83 fixed to saddle member 64. A pair of lifting tongs 89 of the scissors type are attached to the free end of the cable. Adjustably mounted on the cable between the tongs 89, and the release lever eye ring 82 is a detent clamp 86. The detent 86 is of sufficient cross section to prevent it from passing thru the eye ring 82 when the cable is moved during loading operations. The other end of this cable 88 is connected to a reel 90 (Figs. 1 and 2) driven by the motor 92. The reel and motor assembly 90 and 92 are mounted on a platform 94 attached to the uprights 12, 12.

A second cable 96 is attached to the eye ring 78 of the latch bar 72 and is passed over a sheave wheel 98 mounted on the cantilever or loading end of the rail 32. The cable 96 then passes over a sheave wheel 100 mounted on one of the uprights 4, 4 and from there to a sheave wheel 102 supported by the cable members 104 attached to the uprights 2, 2. From this point, the cable passes back to a sheave wheel 106 mounted at the top portion of one of the uprights 4, 4 and then downwardly along the side of one of the uprights 4, 4 where it is attached to a counter weight 108. The weight of 108 may vary from about 55 pounds to 85 pounds, and in the preferred embodiment is 65 pounds. The sheave arrangement aforedescribed for cable 96 is so designed to allow for slack compensation when the tie-loading apparatus is placed in operation. It is to be understood that other sheave arrangements may be used to satisfy any change in loading conditions.

A limit switch 110 is mounted on the track 32 in a selected position. Arms 112 and 114 are pivotally mounted on the limit switch. The switch can be one of a number of commercial type switches. This switch 110 is connected thru suitable electrical connections to a switch box 116 which in the preferred embodiment of the apparatus is disclosed as being mounted on one of the uprights 12, 12. It is to be understood that the switch box may be mounted in any other suitably selected place. The switch box 116 contains a three-phase magnetic reversing switch also of known type.

Figure 6:
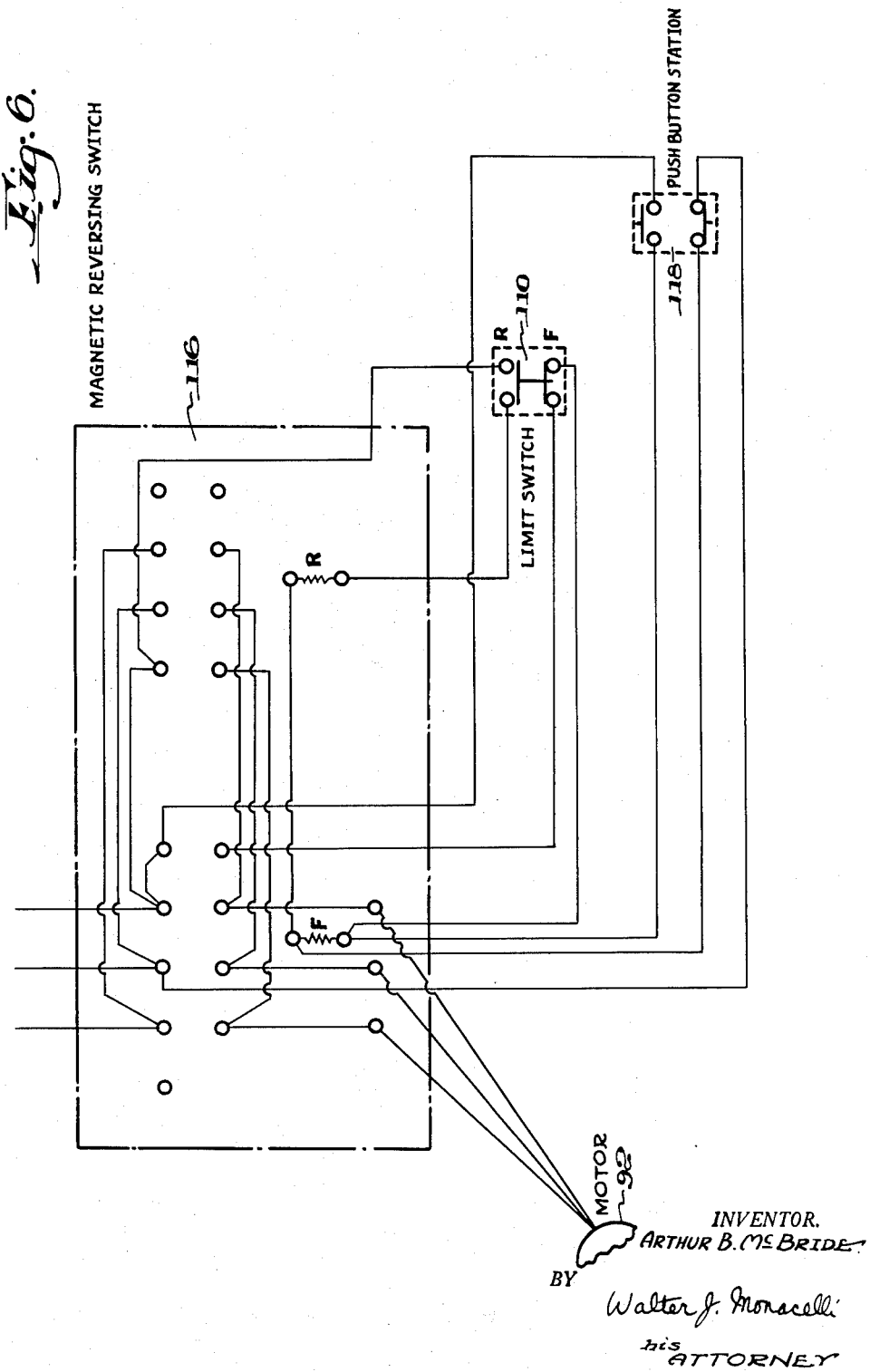
Fig. 6 is a schematic wiring diagram for the disclosed apparatus.

As may be seen from the schematic wiring diagram of Fig. 6, the switch is placed in the circuit of a three-phase power system that leads to the motor 92 which drives reel 90. As aforedescribed, the reel 90 winds cable 96. A push button station 118 is also included in the circuit shown in Fig. 6. This push button station is portable and may be brought into the railroad car so that one person may effectively operate the entire loading apparatus from the car itself. Selectively positioned below the limit switch 110 on the endless conveyor 16 is the hook spreader 120, described hereinafter.

Figure 7:
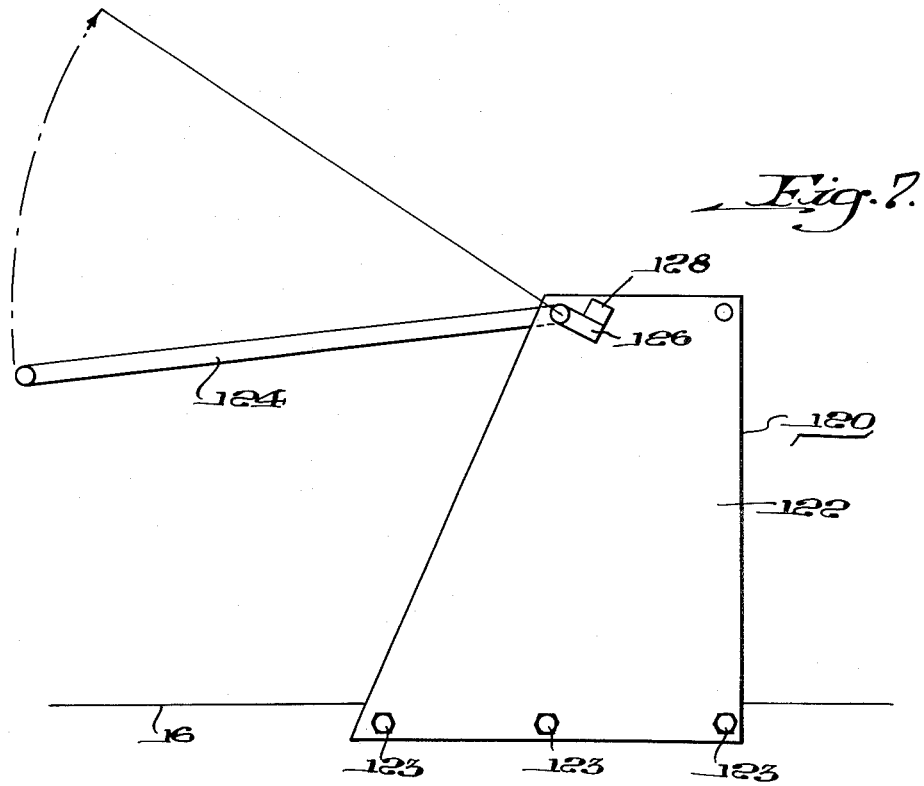
Fig. 7 is an enlarged side view of the hook spreader disclosed in Fig. 1.
Figure 8:
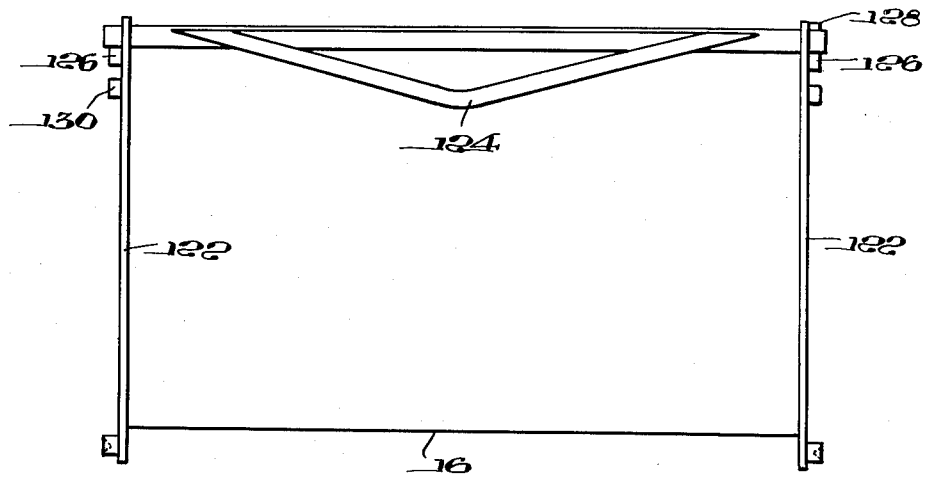
Fig. 8 is an end view of the hook spreader disclosed in Fig. 7.

As may be seen from Figs. 7 and 8, the hook spreader 120 comprises spaced plates 122, 122 fastened to either side of the conveyor 16 by bolts 123. Pivotably mounted between the spaced plates 122, 122 is the wedge-shaped spreader bar 124. Lever arms 126 are positioned integral with either end of the wedge-shaped spreader bar. The wedge-shaped spreader 124 is kept in position by these lever arms 126 which abut against the limit stops 128 and 130 mounted on the support plates 122, 122 respectively.

In operation, a railroad box car is rolled along the tracks 1 to the unloading or cantilever end of the aforedescribed apparatus, the chute 18 of the conveyor 16 being folded back as aforedescribed. It is to be understood that the railroad car may be either of the box or gondola type, since one of the features of the present invention is to provide an apparatus that is readily adaptable to any type of railroad car used. When the car has been properly positioned, the door of the car adjacent the tie unloading apparatus is opened, the folding chute 18 is lowered to rest on the car gunnels, and the apparatus is adjusted in accordance with the height of the load that is to be removed. Track 32 is moved up or down as desired on the vertical uprights 2, 2, 4, 4 by means of the winches 46 and 48 respectively, and the conveyor 16 is inclined to the position desired by operating the winch member 30. The rail 32 and the conveyor 16 having been set to the desired position the detent 86 is adjusted on the cable 88 in accordance with these settings, and it is then possible to proceed with the unloading operation. It should be noted at this point that the motor 92 is not in operation. Accordingly, the trolley 50 is moved to the loading end of rail 32 by the counter weight 108 connected to one end of the trolley thru the cable 96 and the aforedescribed sheave arrangement 98, 100, 102, and 106. Since the latch bar 72, to which cable 96 is connected thru eyelet 78 has been caused to pivot clockwise about pin 74 by counter weight 108 at the end of cable 96, it locks into engagement with the latch block 84 integral with the rail 32 when the trolley reaches this end of the rail. This locking arrangement places trolley 50 in fixed position. The operator then enters into the box car and attaches tongs 89 to a tie that he wishes to unload. Since the sheave wheel 70 over which the cable 88 passes is pivotally mounted, the operator is given additional maneuverability in moving the tongs 89 fastened to cable 88 to a desired position. The tongs having been engaged with a selected tie to be unloaded, the operator then momentarily presses the start button on the portable push button station 118 which has been brough into the railroad car. By so doing, "forward" coil F (Fig. 6) is energized to complete the circuit and motor 92 begins to run. This causes reel 90 to be driven in a forward position and the cable 88 starts to wind on the reel. As the cable 88 winds away from the side of the car, the adjusted detent 36 on the cable 88 strikes the eyelet 82 of the release lever 80. This causes latch bar 72, to which the release lever 80 is mounted, to pivot in a counter-clockwise direction about the pin 74 and thus the latch bar is moved out of locking engagement with the latch block 84, releasing the trolley 50 from set position. The detent 86, being larger than the eyelet 82, cannot pass therethrough and subsequent reeling of cable 88 causes trolley 50 to move along rail 32 toward the conveyor 16. As the trolley goes forward, it strikes lever arm 114 of limit switch 110. This breaks the circuit of the "forward" coil F (Fig. 6) and energizes "reverse" coil R of magnetic switch 116 causing motor 92 to reverse and thus reversing the direction of movement of the trolley. As the trolley travels in reverse, it hits the other lever arm 112 which has been pivoted into a downward position by the upward pivoting of the lever arm 114. When the trolley strikes lever arm 112, all circuits of the limit switch are opened and reel 90 is no longer driven by motor 92. Trolley 50 is then pulled back to loading position by counter weight 108 attached to the side of the trolley, as aforedescribed, thru cable 96, and, as aforedescribed, trolley 50 is again locked into position by means of latch bar 72 which pivots clockwise about pin 74.

It is to be noted that when trolley 50 is moved on rail 32 to the position where it strikes limit switch arm 114, tongs 89 come into engagement with hook spreader 124. This wedge-shaped hook spreader 124 causes the tongs to be spread apart and the load carried by the tongs is released to rest freely on conveyor table 16. The tie is then carried by the conveyor 16 to an idle roll table 25 and then to separating tables or to any other selected point desired. The idle conveyor table 25 shown in the preferred embodiment is an optional feature and only a conveyor 16 need be provided.

While the description and drawings illustrate particular embodiments of the invention, various modifications within the language of the description of the claims are intended to be claimed herein.

The invention claimed is:

1. An article unloading apparatus comprising a plurality of sets of spaced uprights; a conveyor mounted between said sets of spaced uprights and adapted to be adjusted at an incline thereto; a track means mounted between said sets of spaced uprights over said conveyor and extending the length thereof, said track means being adjustable relative said conveyor and being movable between said uprights in a direction substantially normal to said uprights, said track means also being of greater length than the distance between adjacent sets of spaced uprights so as to have one end project in cantilever fashion from said spaced sets of uprights; a trolley means slideably positioned on said track means; said trolley means having an article handling hook suspended therefrom in moveable position above said conveyor; and power means connected to said trolley means, said power means being adapted to move said trolley means to the extended cantilever portion of said track means where the article handling hook may be loaded, then to move said trolley means above the conveyor for unloading of said article handling hook; and load releasing means associated with said conveyor whereby the hook may be automatically unloaded and returned to the loading position.

2. The apparatus of claim 1 wherein said track is vertically adjustable on said uprights.

3. The apparatus of claim 2 wherein said article handling hook comprises a tong-like arrangement and said load releasing means comprising a wedge-shaped hook spreader positioned on said conveyor adapted to wedge said tongs apart when brought into engagement with said hook causing the tongs to release the load which it may carry.

4. The apparatus of claim 3 in which said conveyor is of the endless type.

5. The apparatus of claim 4 in which the loading end of said endless conveyor has a pivotable folding chute arrangement whereby said chute may be pivoted in a direction away from the load to permit the apparatus to be brought in closer proximity to the load.

6. The apparatus of claim 5 in which said power means comprises a motor driven reel, counter weight and cable system wherein a first cable has one end attached to said reel and the other end attached to one end of said trolley means; and a second cable has one end attached to said counter weight and the other end attached to the other end of said trolley means whereby the trolley means is moved in one direction on the track means when said first cable is wound on said motor driven reel and is moved in the opposite direction by said second cable and counter weight when said first cable is allowed to unwind on said motor driven reel.

7. The apparatus of claim 6 and a limit switch positioned on said track means in the path of said trolley adapted to be actuated by the movement of said trolley to cause said motor driven reel to reverse its direction of rotation.

8. The apparatus of claim 7 wherein said track means has a latch block affixed to the cantilever end thereof and wherein said trolley means has a latch bar pivotably mounted thereon adapted to engage said latch block to hold said trolley means at the cantilever end of said track means.

9. The apparatus of claim 8 wherein said first cable having one end connected to said motor driven reel has the other end connected to said suspended tongs of said trolley means; a release lever fixed to one end of said pivotable latch bar; a detent positioned on said first cable member and adapted to abut said release lever when said first cable is wound on said motor driven reel to release said latch bar from engagement with said latch block to allow the trolley means to be pulled along the track toward said reel; and wherein said second cable having one end connected to said counterweight has the other end connected to the other end of said latch bar whereby said latch bar will be pivoted into locking position with said latch block when said trolley means has been pulled by the counter weight to the cantilever end position of the track means.

10. The apparatus of claim 9, wherein said detent is slideably mounted on the cable to permit detent adjustment in accordance with said rail and said conveyor adjustment.

References Cited in the file of this patent

UNITED STATES PATENTS

| | | |
|---|---|---|
| 924,723 | Bartholomew | June 15, 1909 |
| 1,745,045 | Romine | Jan. 28, 1930 |
| 2,102,337 | Rose | Dec. 14, 1937 |
| 2,263,482 | Allard | Nov. 18, 1941 |
| 2,398,177 | Elliott | Apr. 9, 1946 |
| 2,467,113 | Deiters | Apr. 12, 1949 |